United States Patent
V (10) Patent No.: US 12,376,159 B2
(45) Date of Patent: Jul. 29, 2025

(54) PRIORITY ACCESS FOR Wi-Fi 7 WIRELESS LOCAL AREA NETWORKS (WLANs)

(71) Applicant: Fortinet, Inc., Sunnyvale, CA (US)

(72) Inventor: Vijayakumar V, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 386 days.

(21) Appl. No.: 18/089,196

(22) Filed: Dec. 27, 2022

(65) Prior Publication Data
US 2024/0215080 A1 Jun. 27, 2024

(51) Int. Cl.
*H04W 74/08* (2024.01)
*H04W 84/12* (2009.01)

(52) U.S. Cl.
CPC ........ *H04W 74/0875* (2013.01); *H04W 84/12* (2013.01)

(58) Field of Classification Search
CPC .......................... H04W 74/0875; H04W 84/12
See application file for complete search history.

(56) References Cited

U.S. PATENT DOCUMENTS

2014/0146764 A1* 5/2014 Kim ..................... H04W 74/006 370/329
2024/0205903 A1* 6/2024 Yu ......................... H04L 5/0094

OTHER PUBLICATIONS

On Quality-of-Service Provisioning in IEEE 802.11ax WLANs DER-JIUNN DENG1, (Member, IEEE), SHAO-YU LIEN2, JORDEN LEE3, and KWANG-CHENG CHEN3,4, (Fellow, IEEE) (Year: 2016).*
Multi-Channel Mobile Access Point in Next-Generation IEEE 802.11be WLANs Sharan Naribole, Srinivas Kandala, and Ashok Ranganath; Samsung Semiconductor, Inc., San Jose, California USA Email: fn.sharan, srini.k1, ashok.rg@samsung.com (Year: 2021).*
LLR Metrics for 4096-QAM Soft-Decision: Implementation in IEEE 802.11be (Wi-Fi 7) Roger Pierre Fabris Hoefel; Electrical Engineering Department; Federal University of Rio Grande do Sul (UFRGS) (Year: 2021).*
Advanced Resource Allocation Techniques for Very High Data Multimedia Traffic Over IEEE802.11ac Wireless Networks Summera Nosheen; B.Sc (Computer Engineering); M.Sc (Year: 2021)*

* cited by examiner

*Primary Examiner* — Nizam U Ahmed
(74) *Attorney, Agent, or Firm* — Law Office of Dorian Cartwright; Dorian Cartwright (57) ABSTRACT

Groups of Wi-Fi 7 stations are created including identifying Wi-Fi 7 stations accessing the channel for multimedia traffic and creating a group of stations accessing the channel for multimedia traffic. Responsive to reaching the threshold usage for channel usage, a high usage priority mode is activated to prioritize multimedia traffic. In high usage priority mode, notifying the group of Wi-Fi 7 stations of EDCA channel contention parameters using broadcast, management action frame, including notifying the group of multimedia Wi-Fi 7 stations. Values of EDCA parameters in the broadcast management action frame for the at least one multimedia group are modified during high usage to allow more aggressive contention to the at least one multimedia group with multimedia traffic.

20 Claims, 5 Drawing Sheets

Management Action frame format: 300

| Frame control | Duration ID | Address1: Receiver Address | Address2: Transmitter Address | User information | Common information | FCS |

PRIORITY ACCESS FOR Wi-Fi 7 WIRELESS LOCAL AREA NETWORKS (WLANs)

FIELD OF THE INVENTION

The invention relates generally to computer security, and more specifically, to use enhanced distributed channel access (EDCA) parameters for establishing traffic priority for channel access to groups of Wi-Fi 7 stations.

BACKGROUND

In United States, DHS/CISA/ECD priority telecommunications services programs provide national security and emergency preparedness (NS/EP) users and public safety users the ability to communicate on telecommunications networks during times of network congestion. Emergency Telecommunications Service (ETS) specified in ITU-T E.107, a national service providing priority telecommunications to the ETS authorized users in times of disaster and emergencies (e.g., floods, earthquakes, hurricanes, terrorist attacks). During these times, physical damage to networks and congestion overload, can hinder emergency communications. Emergency preparedness communications service (EPCS) features have been defined in IEEE 802.11be (Wi-Fi 7) as an on-demand capability that allows access points to authorize stations for communicate with a higher priority. Wi-Fi 7 uses higher speeds than Wi-Fi 6 with 4096 QAM symbols, 320 Mhz bandwidth and 16 spatial streams. Additionally, IEEE 802.11be Wi-Fi 7 uses the 2.4, 5 and 6 Ghz spectrum bands and is known as extreme high throughput (EHT) wireless. Additionally, the standard introduces NS/EP priority access function.

Problematically, Wi-Fi 7 only addresses priority access on a per station basis. Each individual station can have a priority set. With the high speeds of Wi-Fi 7, an amount of resources necessary for handling traffic is higher, so the resource usage from individual priority notifications is burdensome.

What is needed is a robust technique for using EDCA parameters for establishing traffic priority for channel access to groups of Wi-Fi 7 stations.

SUMMARY

To meet the above-described needs, methods, computer program products, and systems for intelligent station associations to best serving access points.

In one embodiment, groups of Wi-Fi 7 stations, are created including identifying Wi-Fi 7 stations accessing the channel for multimedia traffic and creating a group of stations accessing the channel for multimedia traffic. Prior to reaching the threshold usage, the groups of Wi-Fi 7 stations are notified of EDCA channel contention parameters using unicast, management action frames to each individual Wi-Fi 7 station. Responsive to reaching the threshold usage for channel usage, a high usage priority mode is activated to prioritize multimedia traffic. In high usage priority mode, the group of Wi-Fi 7 stations are notified of EDCA channel contention parameters using broadcast, management action frame, including notifying the group of multimedia Wi-Fi 7 stations. Specific EDCA parameters can be determined automatically by artificial intelligence (AI) or machine learning, retrieved automatically from a predetermined table of EDCA value versus usage, or set by a network administrator.

In another embodiment, values of EDCA parameters in the broadcast management action frame for the at least one multimedia group are modified during high usage to allow more aggressive contention to the at least one multimedia group with multimedia traffic. Network traffic is received for processing resulting from the EDCA parameters applied by the group of multimedia Wi-Fi 7 stations.

Advantageously, network performance and computer performance are improved with more responsive access points.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for using EDCA parameters for establishing traffic priority for channel access to groups of Wi-Fi 7 stations. One of ordinary skill in the art will recognize many alternative embodiments that are not explicitly listed based on the following disclosure. For example, Wi-Fi 7 is used for illustrative purposes herein, but the same techniques can be applied to other wireless protocols with similar characteristics.

I. Systems for Multimedia Station Group Priority Access (FIGS. 1-2)

Figure 1:
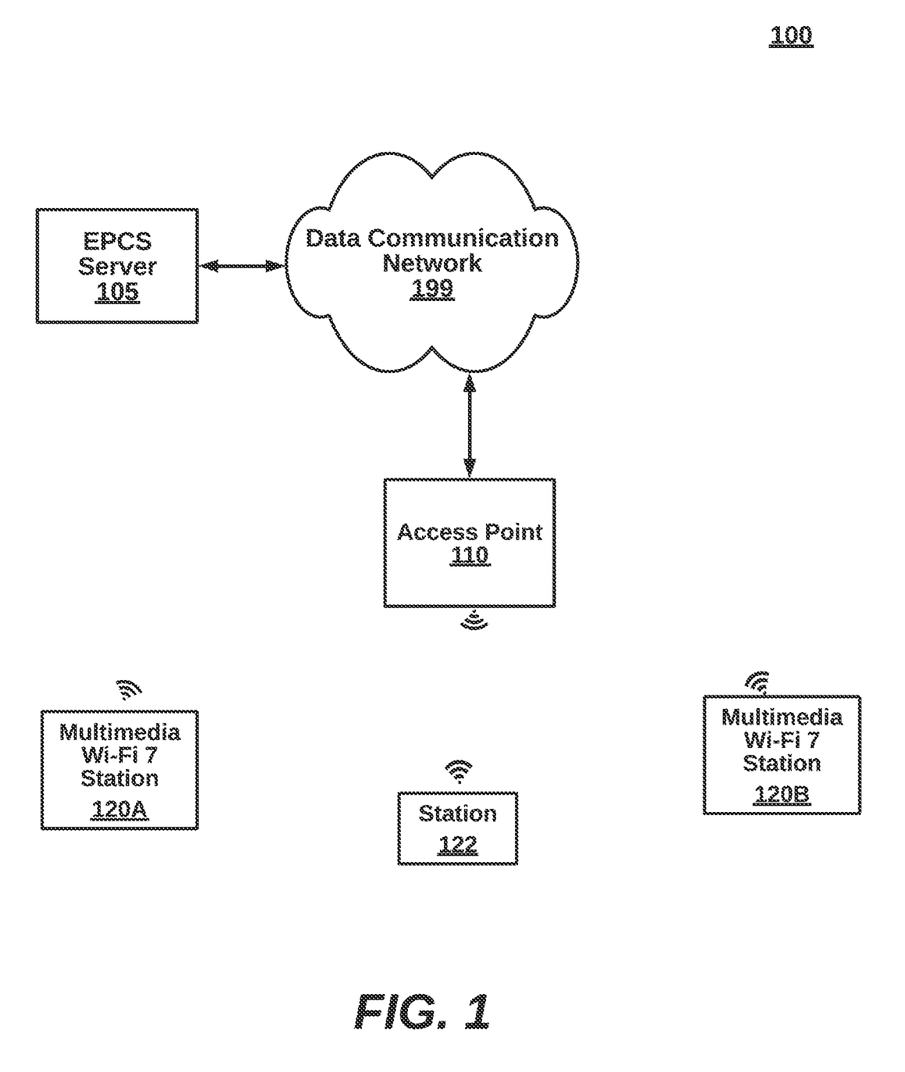
FIG. 1 is a high-level block diagram illustrating a system for using EDCA contention parameters for establishing traffic priority for channel access between groups of Wi-Fi 7 stations, according to one embodiment.
Figure 2:
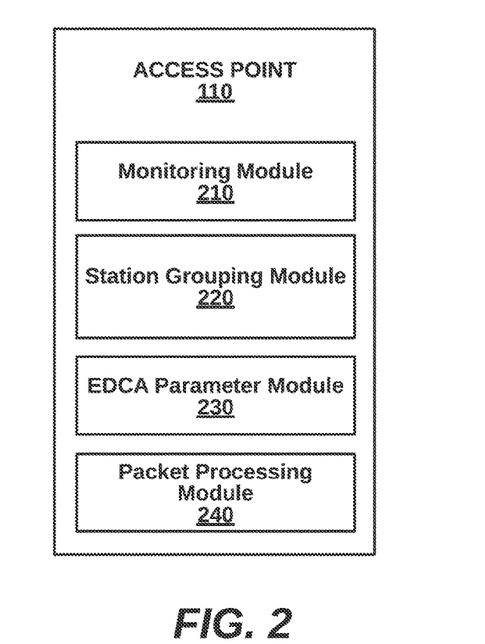
FIG. 2 is a more detailed block diagram illustrating an access point of the system of FIG. 1, according to one embodiment.

FIG. 1 is a high-level block diagram illustrating a system 100 for using EDCA parameters for establishing traffic priority for channel access to groups of Wi-Fi 7 stations, according to one embodiment. The system 100 includes a Wi-Fi 7 access point 110 and multimedia Wi-Fi 7 stations 120A, 120B, and station 122. Other embodiments of the system 100 can include additional components that are not shown in FIG. 1.

In one embodiment, the components of the automatic system 100 are coupled in communication over a private network connected to a public network, such as the Internet. In another embodiment, system 100 is an isolated, private network. The components can be connected to the data communication system via hard wire (e.g., EPCS server 105, access point 110). The components can also be connected via wireless networking (e.g., stations 120A, 120B, 122). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like. Components can use IPV4 or IPV6 address spaces.

The Wi-Fi 7 access point 120 automatically enables EPCS for priority access to multimedia stations during high contention periods of the network. Network administrators or other processes can set the threshold, or a default value can control. Feature support is indicated in EPCS beacons or probe responses. In turn, stations indicate support in probe requests or reassociation requests. After high contention periods have ended, or a period of time has expired, EPCS support can be disabled.

Multimedia traffic, generally refers to voice or audio traffic types. EPCS refers specifically to emergency telephone calls. The four traffic types of access categories in order of low priority to high priority include background traffic, best effort traffic, video traffic and voice traffic. Other embodiments can use different orders of priority and different types of traffic.

Figure 3:
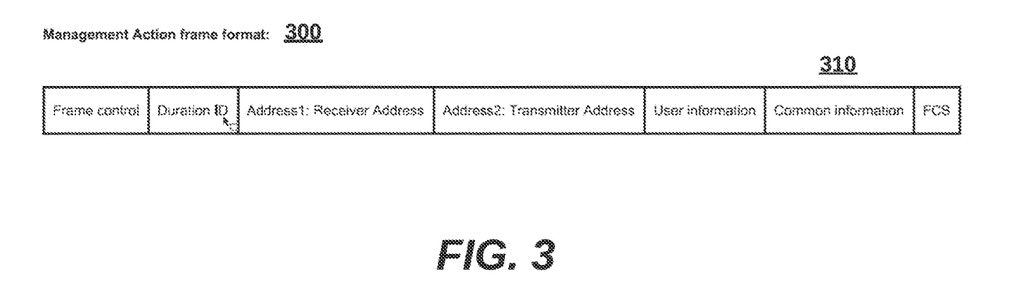
FIG. 3 is a block diagram illustrating a management action frame with EDCA contention parameters, according to an embodiment.

A management action frame 310 is shown in FIG. 3. The fields include a user information field 310 and a common information field 320. The user information field 310 can define a group of stations with an association ID. The common information field 310 can include EDCA contention parameters. A Wi-Fi Alliance version of EDCA, Wi-Fi multi media (WMM), can also be used to manage channel contention. The management action frame 310, in a preferred embodiment, is sent unicast to individual stations during periods of low channel usage and is sent broadcast to a group of multimedia stations during periods of high channel usage. One example of EDCA contention parameters for each type of traffic, AC-BK (background traffic), AC-BE (best effort traffic), AC-VI (video traffic), and AC-VO (voice traffic), includes AIFSN (arbitration inter-frame space number determines channel idle time), ECWmin (specifies the exponent form of the minimum contention window), ECWmax (specifies the exponent form of the maximum contention window), and TXOP limit (transmission opportunity limit in ms as maximum duration a client can occupy a channel). By setting different min and max back-off slots, one stream has an advantage over another.

The Wi-Fi 7 stations 130A-E are capable of Wi-Fi 7 communications as well as legacy communications such as Wi-Fi 6. The station 122 is only capable of legacy communications. Stations respond to beacons sent out by access points advertising services. Once associated and authenticated, data packets can be wirelessly exchanged with the network.

Some embodiments include a Wi-Fi controller to centrally manage a group of access points. In this case, when stations roam from one access point to another access point under the same Wi-Fi controller, historical information can be quickly retrieved for applying uniform policies during roaming.

FIG. 2 is a more detailed block diagram illustrating the access point 120 of the system of FIG. 1, according to one embodiment. The access point 110 includes a monitoring module 210, a station grouping module 220, an EDCA parameter module 230, and a packet processing module 240. The components can be implemented in hardware, software, or a combination of both.

The monitoring module 210 to monitor channel usage of wireless station data traffic for threshold usage. For example, network statistics for each access point and each station can be collected. The network statistics can be sent periodically or when triggered for an alert. In one case, the monitoring module 210 analyzes traffic to and from an access point for channel usage. In another case, network data is sent to the monitoring module 210 from stations, other access points, or Wi-Fi controllers.

The station grouping module 220 can create groups of Wi-Fi 7 stations based on priority. In a preferred embodiment, multimedia stations are given the highest priority, and in particular, emergency service data packets. Wi-Fi 7 stations accessing the channel for multimedia traffic are identified to form a group of multimedia stations. In one embodiment, various Wi-Fi 7 multimedia groups are prioritized between each other. In another embodiment, non-multimedia groups are prioritized between each other.

The EDCA parameter module 230 to, prior to reaching the threshold usage, notify the groups of Wi-Fi 7 stations of EDCA channel contention parameters using unicast, management action frames sent to each individual Wi-Fi 7 station. Responsive to reaching the threshold usage for channel usage, the monitoring module 219 can activate a high usage priority mode to prioritize multimedia traffic. In one case, the EPCS server 105 or Wi-Fi controller activates high usage priority mode. For example, responsive to a hurricane in New Orleans, or other conditions, the EPCS server 105 preemptively actives high usage mode in anticipation of traffic changes.

The EDCA parameter module 230, in high usage priority mode, notifies the groups of Wi-Fi 7 station of EDCA channel contention parameters using broadcast, management action frame, including notifying the group of multimedia Wi-Fi 7 stations. Values of EDCA parameters in the broadcast management action frame for the at least one multimedia group are increased during high usage to allow more aggressive contention to the at least one multimedia group with multimedia traffic. Specific EDCA parameters can be determined automatically by artificial intelligence (AI) or machine learning, retrieved automatically from a predetermined table of EDCA value versus usage, or set by a network administrator.

The packet processing module 240 receives network traffic resulting from the EDCA parameters applied by the group of multimedia Wi-Fi 7 stations.

II. Methods for Multimedia Station Group Priority Access (FIGS. 4-5)

Figure 4:
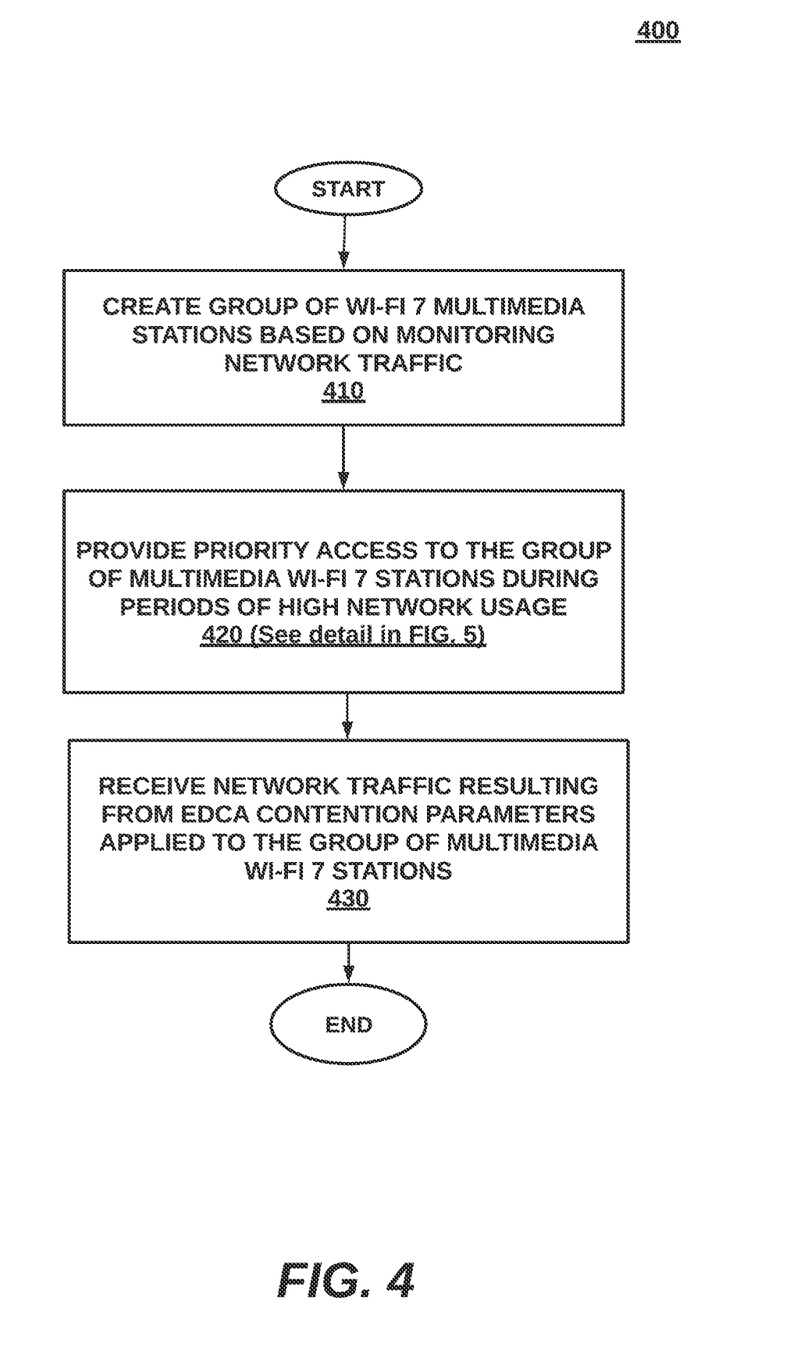
FIG. 4 is a high-level flow diagram illustrating a method for using EDCA contention parameters for establishing traffic priority for channel access between groups of Wi-Fi 7 stations, according to one embodiment.
Figure 5:
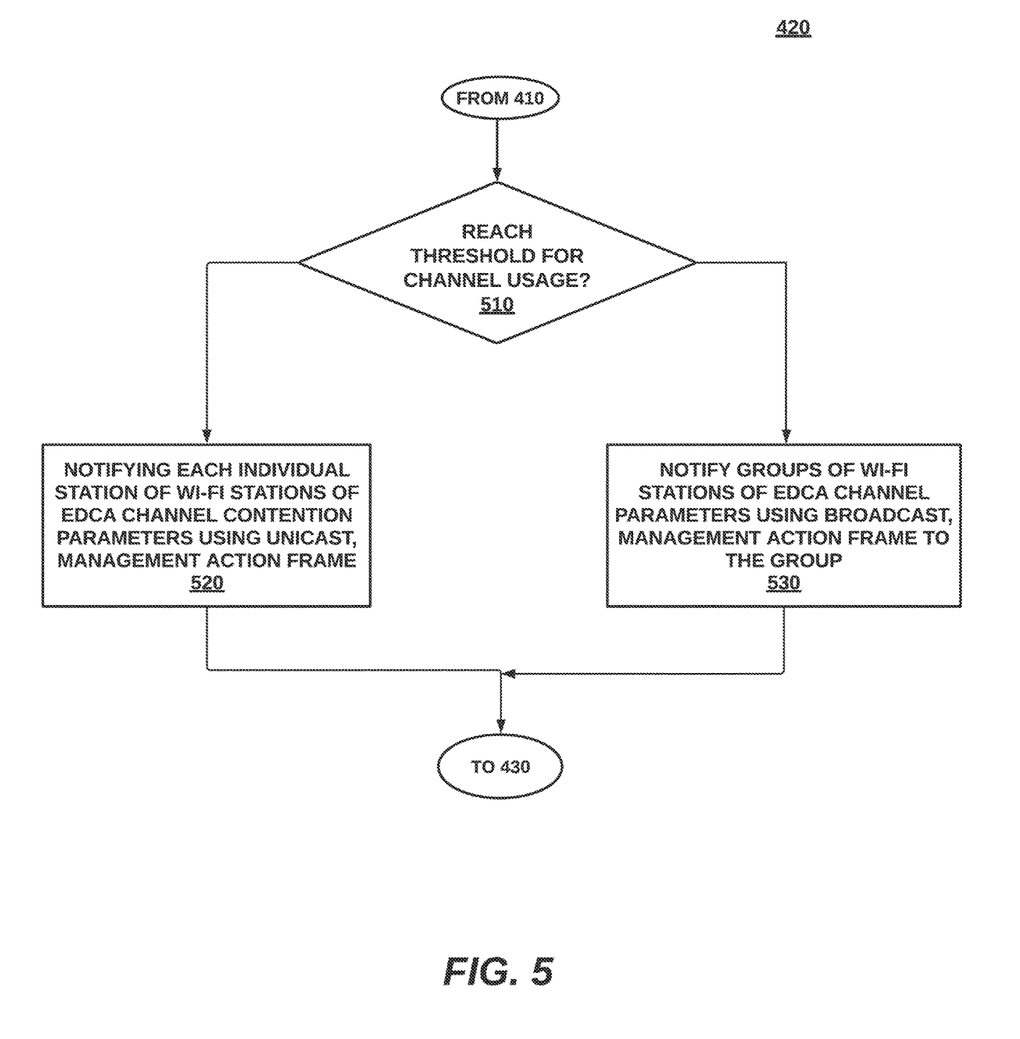
FIG. 5 is a more detailed flow diagram illustrating a step for priority access to a group of multimedia stations, during periods of high usage, from the method of FIG. 4, according to an embodiment.

FIG. 4 is a high-level flow diagram illustrating a method 400 for using EDCA contention parameters for establishing traffic priority for channel access between groups of Wi-Fi 7 stations, according to one embodiment. The method 400 can be implemented by, for example, system 100 of FIG. 1.

At step 410, groups of Wi-Fi 7 stations area created, including a Wi-Fi 7 stations accessing the channel for multimedia traffic. Channel usage of wireless station data traffic is constantly monitored, and multimedia traffic behavior can be learned over time.

At step 420, priority access is provided to the group of multimedia stations, during periods of high channel usage, as described more fully below in relation to FIG. 5.

At step 430, receiving network traffic resulting from the EDCA parameters applied by the group of multimedia Wi-Fi 7 stations.

FIG. 5 shows more detail regarding the step 420 for priority access to a group of multimedia stations, during periods of high usage.

At step 510, responsive to reaching the threshold usage for channel usage, a high usage priority mode is activated to prioritize multimedia traffic. Prior to reaching the threshold usage, the groups of Wi-Fi 7 stations of EDCA channel contention parameters using unicast, management action frames to each individual Wi-Fi 7 station, at step 520. In high usage priority mode, the groups of Wi-Fi 7 station of EDCA channel contention parameters using broadcast, are notified with a management action frame, including notifying the group of multimedia Wi-Fi 7 stations. Values of EDCA parameters in the broadcast management action frame for the at least one multimedia group are increased during high usage to allow more aggressive contention to the at least one multimedia group with multimedia traffic.

III. Computing Device for Intelligent 6 GHz Access Point Steering (FIG. 6)

Figure 6:
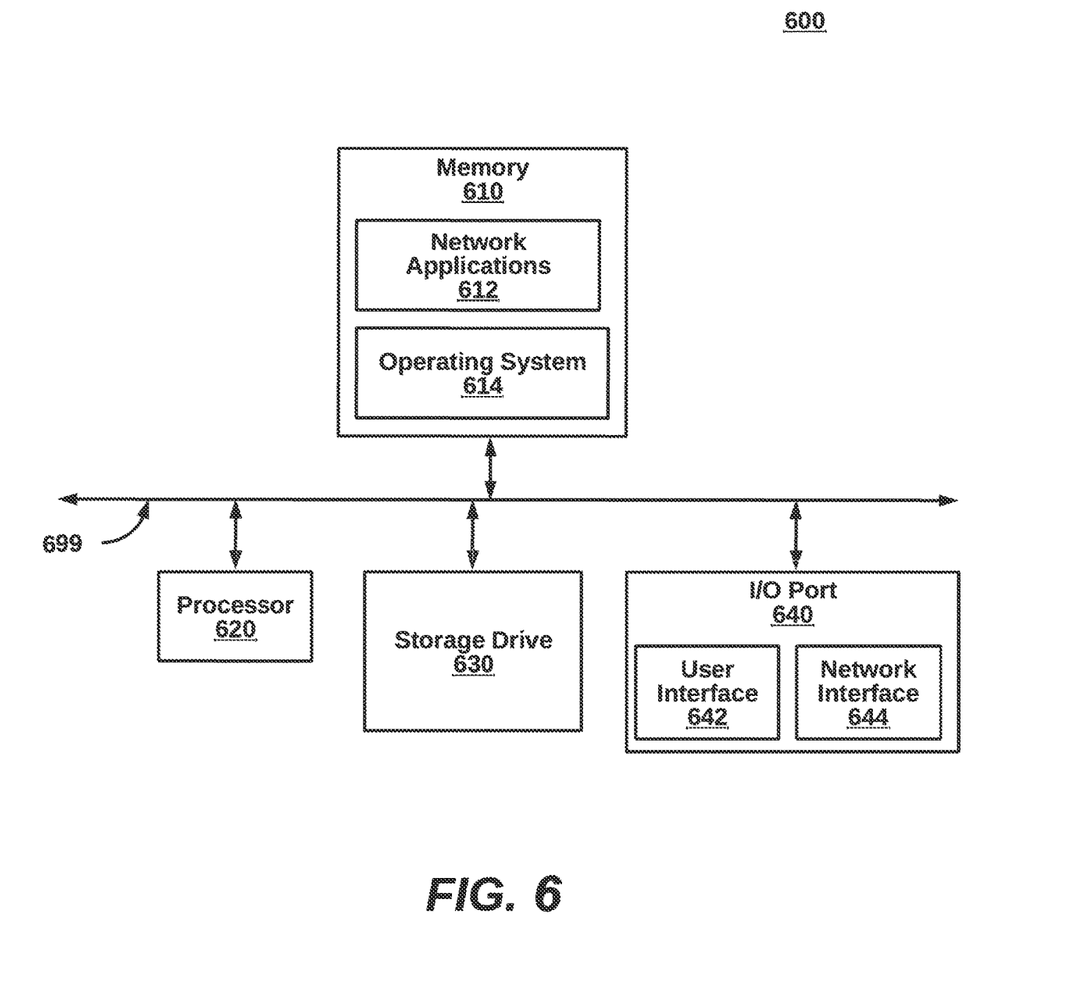
FIG. 6 is a block diagram illustrating an example computing device for the system of FIG. 1, according to one embodiment.

FIG. 6 is a block diagram illustrating a computing device 600 for use in the system 100 of FIG. 1, according to one embodiment. The computing device 600 is a non-limiting example device for implementing each of the components of the system 100, including an EPCS server 105, access point 110, and stations 120A, 120B and 122. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access applications, an access applications that uses networking, a remote access applications executing locally, a network protocol access applications, a network management access applications, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access applications—specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a Wi-Fi 7 access point on a wireless local access network (WLAN), at least partially implemented in hardware, for using enhanced distributed channel access (EDCA) parameters for establishing traffic priority for channel access between groups of Wi-Fi 7 stations, the method comprising:
monitoring channel usage of wireless station data traffic for threshold usage;
creating groups of Wi-Fi 7 stations, including identifying Wi-Fi 7 stations accessing the channel for multimedia traffic and creating a group of Wi-Fi 7 stations of the groups of Wi-Fi 7 stations that have been identified as accessing the channel for multimedia traffic;
prior to reaching the threshold usage, notifying the groups of Wi-Fi 7 stations of EDCA channel contention parameters using unicast, management action frames to each individual Wi-Fi 7 station;
responsive to reaching the threshold usage for channel usage, activating a high usage priority mode to prioritize multimedia traffic;
in high usage priority mode, notifying the groups of Wi-Fi 7 station of EDCA channel contention parameters using broadcast, management action frame, including notifying the group of multimedia Wi-Fi 7 stations,
wherein values of EDCA parameters in the broadcast management action frame for the at least one multimedia group are modified during high usage to allow more aggressive contention to the at least one multimedia group with multimedia traffic; and
receiving network traffic resulting from the EDCA parameters applied by the group of multimedia Wi-Fi 7 stations.

2. The method of claim 1, wherein EDCA channel contention parameters are determined automatically by machine learning.

3. The method of claim 1, wherein the EDCA contention parameter are stored in a table prescribing EDCA values for varying high and low usage levels.

4. The method of claim 1, wherein the EDCA contention parameters include at least one type of traffic from: AC-BK, AC-BE, AC-VI, and AC-VO.

5. The method of claim 1, wherein EDCA contention parameters include at least one of: AIFSN, ECWmin, ECWmax, and TXOP Limit.

6. The method of claim 1, further comprising: responsive to dropping below threshold usage for channel usage, deactivating the high usage priority mode.

7. The method of claim 1, further comprising: prioritizing individual data packets or individual stations between a group of Wi-Fi 7 stations.

8. A Wi-Fi 7 access point on a wireless local access network (WLAN), at least partially implemented in hardware, for using enhanced distributed channel access (EDCA) parameters for establishing traffic priority for channel access between groups of Wi-Fi 7 stations, the Wi-Fi 7 access point comprising:
a processor;
a network interface communicatively coupled to the processor and to the WLAN; and
a memory, communicatively coupled to the processor and storing modules, comprising:
a monitoring module configured to monitor channel usage of wireless station data traffic for threshold usage;
a station grouping module configured to create groups of Wi-Fi 7 stations, including identifying Wi-Fi 7 stations accessing the channel for multimedia traffic and creating a group of Wi-Fi 7 stations of the groups of Wi-Fi 7 stations that have been identified as accessing the channel for multimedia traffic;
an EDCA parameter module configured to prior to reaching the threshold usage, to notify the groups of Wi-Fi 7 stations of EDCA channel contention parameters using unicast, management action frames to each individual Wi-Fi 7 station, wherein responsive to reaching the threshold usage for channel usage, the EDCA parameter module activates a high usage priority mode to prioritize multimedia traffic, and in high usage priority mode, the EDCA parameter module notifies the groups of Wi-Fi 7 station of EDCA channel contention parameters using broadcast, management action frame, including notifying the group of multimedia Wi-Fi 7 stations,
wherein values of EDCA parameters in the broadcast management action frame for the at least one multimedia group are modified during high usage to allow more aggressive contention to the at least one multimedia group with multimedia traffic,
wherein the network communication module receives network traffic resulting from the EDCA parameters applied by the group of multimedia Wi-Fi 7.

9. The Wi-Fi 7 access point of claim 8, wherein the EDCA contention parameter are stored in a table prescribing EDCA values for varying high and low usage levels.

10. The Wi-Fi 7 access point of claim 8, wherein the EDCA contention parameters include at least one type of traffic from: AC-BK, AC-BE, AC-VI, and AC-VO.

11. The Wi-Fi 7 access point of claim 8, wherein EDCA contention parameters include at least one of: AIFSN, ECWmin, ECWmax, and TXOP Limit.

12. The Wi-Fi 7 access point of claim 8, further comprising: responsive to dropping below threshold usage for channel usage, deactivating the high usage priority mode.

13. A non-transitory computer-readable medium in a Wi-Fi 7 access point on a wireless local access network (WLAN), at least partially implemented in hardware, storing instructions that, when executed by a processor, perform a computer-implemented method for using enhanced distributed channel access (EDCA) parameters for establishing traffic priority for channel access between groups of Wi-Fi 7 stations, the method comprising:

monitoring channel usage of wireless station data traffic for threshold usage;

creating groups of Wi-Fi 7 stations, including identifying Wi-Fi 7 stations accessing the channel for multimedia traffic and creating a group of Wi-Fi 7 stations of the groups of Wi-Fi 7 stations that have been identified as accessing the channel for multimedia traffic;

prior to reaching the threshold usage, notifying the groups of Wi-Fi 7 stations of EDCA channel contention parameters using unicast, management action frames to each individual Wi-Fi 7 station;

responsive to reaching the threshold usage for channel usage, activating a high usage priority mode to prioritize multimedia traffic;

in high usage priority mode, notifying the groups of Wi-Fi 7 station of EDCA channel contention parameters using broadcast, management action frame, including notifying the group of multimedia Wi-Fi 7 stations, wherein values of EDCA parameters in the broadcast management action frame for the at least one multimedia group are modified during high usage to allow more aggressive contention to the at least one multimedia group with multimedia traffic; and receiving network traffic resulting from the EDCA parameters applied by the group of multimedia Wi-Fi 7.

14. The method of claim 13, wherein EDCA channel contention parameters are determined automatically by machine learning.

15. The method of claim 13, wherein the EDCA contention parameter are stored in a table prescribing EDCA values for varying high and low usage levels.

16. The method of claim 13, wherein the EDCA contention parameters include at least one type of traffic from: AC-BK, AC-BE, AC-VI, and AC-VO.

17. The method of claim 13, wherein EDCA contention parameters include at least one of: AIFSN, ECWmin, ECWmax, and TXOP Limit.

18. The method of claim 13, further comprising: responsive to dropping below threshold usage for channel usage, deactivating the high usage priority mode.

19. The method of claim 13, further comprising: prioritizing individual data packets or individual stations between a group of Wi-Fi 7 stations.

20. The Wi-Fi 7 access point of claim 8, wherein EDCA channel contention parameters are determined automatically by machine learning.

* * * * *